(12) United States Patent
Grafen et al.

(10) Patent No.: US 11,086,294 B2
(45) Date of Patent: Aug. 10, 2021

(54) COMBINING ADDITIVE AND CONVENTIONAL MANUFACTURING TECHNIQUES TO IMPROVE MANUFACTURABILITY

(71) Applicant: AUTODESK, INC., San Rafael, CA (US)

(72) Inventors: Niels Grafen, Munich (DE); Francesco Iorio, Toronto (CA); Nigel Morris, Toronto (CA); Adrian Butscher, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 15/841,008

(22) Filed: Dec. 13, 2017

(65) Prior Publication Data

US 2018/0299868 A1    Oct. 18, 2018

Related U.S. Application Data

(60) Provisional application No. 62/484,838, filed on Apr. 12, 2017.

(51) Int. Cl.
| | |
|---|---|
| *B33Y 50/00* | (2015.01) |
| *G06F 30/00* | (2020.01) |
| *G05B 19/4099* | (2006.01) |
| *G06T 17/20* | (2006.01) |
| *G06F 119/18* | (2020.01) |

(52) U.S. Cl.
CPC .......... *G05B 19/4099* (2013.01); *B33Y 50/00* (2014.12); *G06F 30/00* (2020.01); *G06T 17/205* (2013.01); *G05B 2219/35134* (2013.01); *G05B 2219/49007* (2013.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 2007/0274579 | A1* | 11/2007 | Cai ..................... | A61B 5/02007 382/131 |
| 2014/0067106 | A1* | 3/2014 | Makeig ................ | B29C 64/386 700/98 |
| 2017/0203516 | A1* | 7/2017 | Vernon .............. | G05B 19/4099 |

OTHER PUBLICATIONS

Peter Zelinski, "Forget What You Know", published on Oct. 22, 2013, retrieved from https://www.additivemanufacturing.media/articles/forget-what-you-know on Apr. 28, 2019.*

(Continued)

*Primary Examiner* — Zhengxi Liu
(74) *Attorney, Agent, or Firm* — Artegis Law Group, LLP

(57) ABSTRACT

A design engine analyzes a complex polygonal mesh to identify regions of that mesh that can be simplified. The design engine then replaces those identified regions with simplified geometry that is more easily fabricated using traditional techniques. The remaining complex regions of the mesh are fabricated using additive fabrication techniques. The design engine interacts with both a traditional fabrication device and an additive fabrication device to fabricate the simplified and complex regions of the mesh, respectively. In this manner, a hybrid 3D structure is generated that includes both simplified geometry and complex geometry.

19 Claims, 14 Drawing Sheets

(56) References Cited

OTHER PUBLICATIONS

Umetani, Nobuyuki, and Ryan Schmidt. "Cross-sectional structural analysis for 3D printing optimization." SIGGRAPH Asia Technical Briefs. 2013.*
Author Unknown, "Editing in cross-section", published at http://help.spaceclaim.com/2015.0.0/en/Content/Section.htm, archived at https://web.archive.org/web/20160321162128/http://help.spaceclaim.com/2015.0.0/en/Content/Section.htm on Mar. 21, 2016.*
Luo, Linjie, et al. "Chopper: partitioning models into 3D-printable parts." (2012).*
Luo, Ran, et al. "Interactive design and simulation of tubular supporting structure." Graphical Models 80 (2015): 16-30.*
Shani et al., "Splines as Embeddings for Generalized Cylinders", Computer Vision, Graphics and Image Processing, vol. 27, No. 2, Aug. 1984, pp. 129-156.
Theologou et al., "A comprehensive overview of methodologies and performance evaluation frameworks in 3D mesh segmentation", Computer Vision and Image Understanding, Jan. 3, 2015, 32 pages.
Mortara et al., "Plumber: a Method for a multi-scale decomposition of 3D shapes into tubular primitives and bodies", Proceedings of the 9th ACM symposium on Solid Modeling and Applications, Jun. 2004, 6 pages.
Garro et al., "A tracking approach for the skeletonization of tubular parts of 3D shapes", Vision, Modeling, and Visualization, 2013, 8 pages.

\* cited by examiner

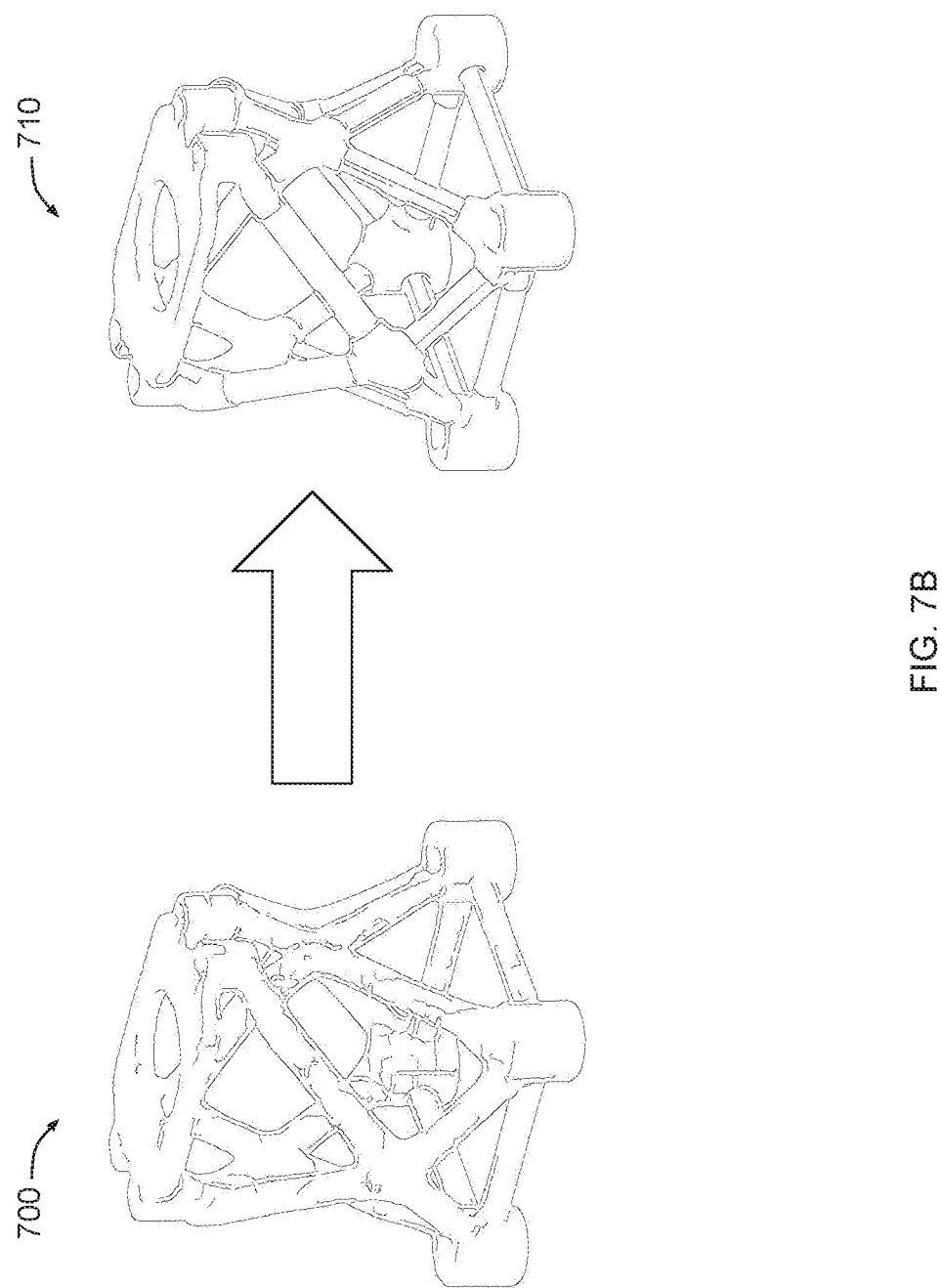

US 11,086,294 B2

COMBINING ADDITIVE AND CONVENTIONAL MANUFACTURING TECHNIQUES TO IMPROVE MANUFACTURABILITY

CROSS-REFERENCE TO RELATED APPLICATIONS

This application claims priority benefit of U.S. Provisional Patent Application titled, "Combining Additive and Conventional Manufacturing Techniques to Improve Manufacturability," filed on Apr. 12, 2017 and having Ser. No. 62/484,838. The subject matter of this related application is hereby incorporated herein by reference.

BACKGROUND OF THE INVENTION

Field of the Invention

Embodiments of the present invention relate generally to computer-aided design and manufacturing and, more specifically, to combining additive and conventional manufacturing techniques to improve manufacturability.

Description of the Related Art

In a typical generative design workflow, an engineer provides a set of design criteria to a generative design software application, and the software application then generates a spectrum of different designs meeting those design criteria. Generative design applications, in general, and topology optimization applications, in particular, are known to produce designs having irregular or amorphous geometries that are generally complex. These types of complex geometries are oftentimes difficult to fabricate using traditional fabrication devices.

In some cases, an additive fabrication device, such as a three-dimensional (3D) printer, can be implemented to fabricate structures having the complex geometries oftentimes associated with generative design. However, conventional additive fabrication devices suffer from at least three drawbacks in this context. First, additive fabrication devices operate slowly and are poorly suited for large production volumes. Second, additive fabrication devices are usually small and cannot be used to fabricate large structures. Third, additive fabrication is more expensive relative to traditional manufacturing and fabrication techniques. Accordingly, although additive fabrication devices are technically capable of fabricating structures having complex geometries, these drawbacks limit the usefulness of additive manufacturing in generative design.

As the foregoing illustrates, what is needed in the art are more effective ways to fabricate structures that are designed using generative design techniques.

SUMMARY OF THE INVENTION

Various embodiments of the present invention set forth a computer-implemented method for generating a polygonal mesh, including determining that a first region included in an initial mesh meets a geometric criterion, determining a representative cross section along a centerline associated with the first region, generating simplified geometry for the initial mesh based on the representative cross section, and replacing the first region with the simplified geometry in the initial mesh to generate the polygonal mesh.

At least one advantage of the techniques described herein is that complex polygonal meshes generated via generative design can be simplified to facilitate more efficient fabrication. These techniques improve the operation of generative design applications because the generation of these simpler meshes reduces reliance on expensive and slow additive manufacturing devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A-7B illustrate various exemplary designs having simplified geometry, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

As noted above, a generative design engineering workflow oftentimes produces designs having geometries that can be difficult to fabricate using traditional fabrication techniques. Although additive fabrication machines may be capable of fabricating structures based on these designs, conventional additive fabrication machines cannot produce such structures in high volumes, with large sizes, and with low cost.

To address these issues, embodiments of the invention include a design engine that analyzes a complex polygonal mesh to identify regions of that mesh that can be simplified. The design engine then replaces those identified regions with simplified geometry that can be more easily fabricated using traditional techniques. The remaining complex regions of the mesh are fabricated using additive fabrication techniques. The design engine interacts with both a traditional fabrication device and an additive fabrication device to fabricate the simplified and complex regions of the polygonal mesh, respectively. In this manner, a hybrid 3D structure is generated that includes both simplified geometry and complex geometry. This approach minimizes the extent to which fabrication relies on additive manufacturing, while still permitting 3D structures to be generated based on designs produced via generative design.

System Overview

Figure 1:
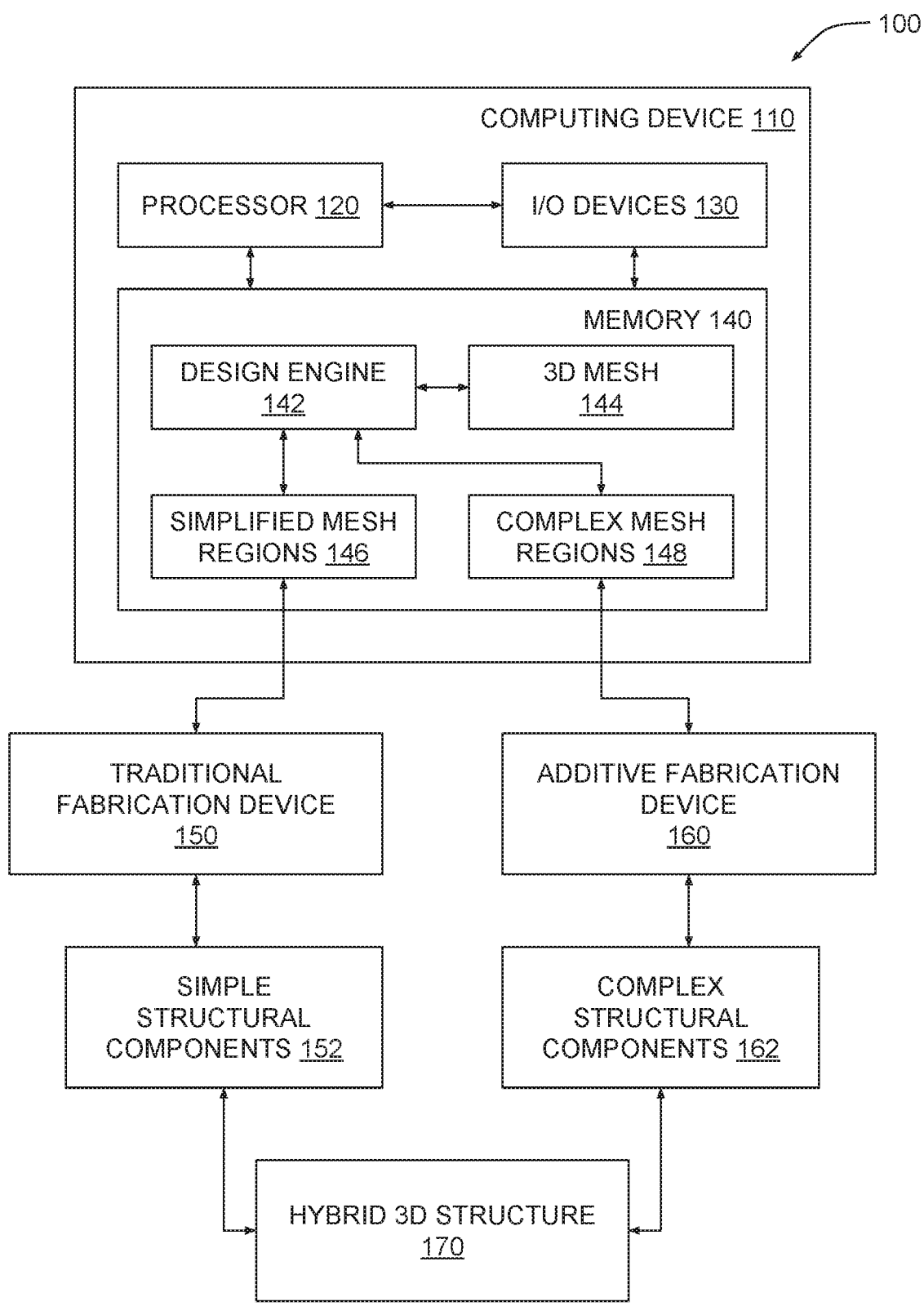
FIG. 1 illustrates a system configured to implement one or more aspects of the present invention.

FIG. 1 illustrates a system configured to implement one or more aspects of the present invention. As shown, a system 100 includes a computing device 110 coupled to a traditional fabrication device 150 and an additive fabrication device 160. Traditional fabrication device 150 is configured to fabricate structures using traditional techniques. Such traditional techniques may include subtractive processes such as turning and milling, various casting processes, closed or open die forging, and forming processes including drawing and rolling. Additive fabrication device 160, by contrast, is configured to fabricate structures using more advanced techniques, including selective laser melting, electron beam melting, three-dimensional (3D) printing, and so forth. Traditional fabrication device 150 and additive fabrication device 160 operate based on instructions received from computing device 110.

As is shown, computing device 110 includes a processor 120, input/output (I/O) devices 130, and memory 140. Processor 120 includes any technically feasible set of hardware units configured to process data and execute software applications. Processor 120 could include, for example, one or more central processing units (CPUs), one or more graphics processing units (GPUs), one or more application specific integrated circuits (ASICs), and any combination thereof. I/O devices 130 include any technically feasible set of devices configured to perform input and/or output operations. I/O devices 130 could include, for example, a keyboard, a mouse, a display device, a speaker, a touchscreen, a universal serial bus (USB) port, and so forth. Memory 140 includes any technically feasible set of storage media configured to store data and software applications. Memory 140 could be, for example, a hard disk, a random access memory (RAM) module, a read-only memory (ROM), and and any combination thereof. Memory 140 includes a design engine 142, a 3D mesh 144, simplified mesh regions 146 and complex mesh regions 148.

Design engine 142 is a software application that, upon execution by processor 120, analyzes 3D mesh 144 to identify specific regions of 3D mesh 244 that can be replaced with simple geometric shapes. Design engine 142 then generates simplified mesh regions 144 to replace those specific regions. For example, design engine 142 could analyze 3D mesh 244 to identify tubular regions of 3D mesh 244, and then replace those regions with cylinders. Simplified mesh regions 144 may include simple geometric primitives, including cylinders, cubes, spheres, and so forth, or may include simple polygonal meshes. Simplified mesh regions 144 are suitable for fabrication via traditional fabrication device 150. Based on simplified mesh regions 144, traditional fabrication device 150 fabricates simple structural components 152.

Design engine 142 also outputs the remaining complex mesh regions 248. Complex mesh regions 248 are suitable for fabrication via additive fabrication device 160. Based on complex mesh regions 148, additive fabrication device fabricates complex structural components 162. Simple structural components 152 and complex structural components 162 can then be combined to produce a hybrid structure 170. In one embodiment, traditional fabrication device 150 and additive fabrication device 160 interact to cooperatively generate hybrid 3D structure 170 after fabrication of simple structural components 152 and complex structural components 162 is complete. In another embodiment, another fabrication machine (not shown) performs final assembly of hybrid structure 170.

Design engine 142 may apply any technically feasible criteria for distinguishing regions of 3D mesh 144 that are good candidates for simplification from complex regions of the mesh that are not good candidates for simplification. Design engine 142 may also perform a variety of approaches for simplifying regions of 3D mesh 144 to generate simplified mesh regions 146. FIGS. 2-11 set forth one approach to identifying and simplifying specific mesh regions.

Figure 2:
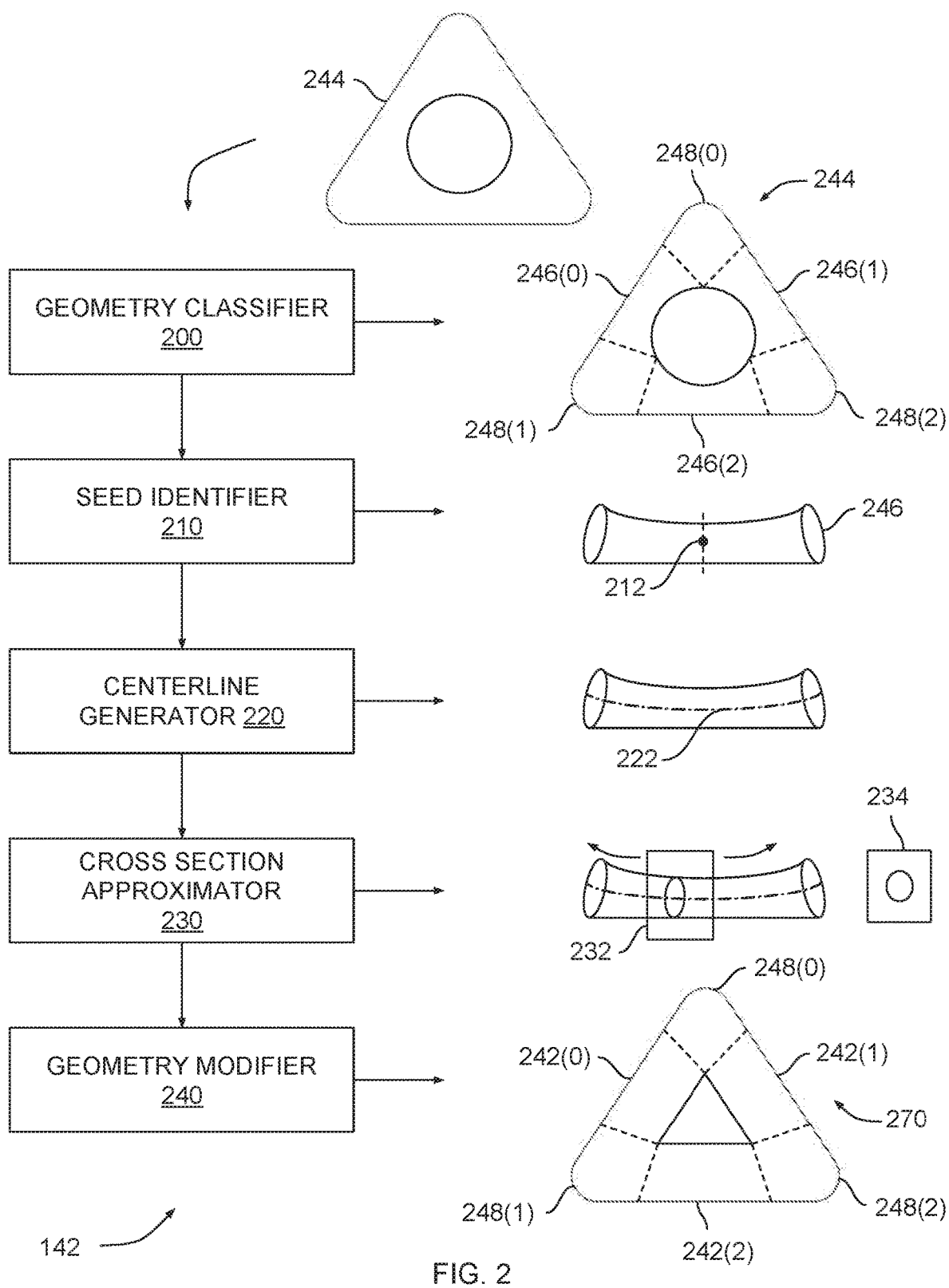
FIG. 2 is a more detailed illustration of the design engine of FIG. 1, according to various embodiments of the present invention.

FIG. 2 is a more detailed illustration of the design engine of FIG. 1, according to various embodiments of the present invention. As shown, design engine 142 includes a geometry classifier 200, a seed identifier 210, a centerline generator 220, a cross section approximator 230, and a geometry modifier 240. These various elements of design engine 142 are software modules via which design engine 142 converts a 3D mesh 244 into a hybrid mesh 270, as described in greater detail herein.

In operation, geometry classifier 200 analyzes 3D mesh 244 to identify candidate mesh regions 246 and complex mesh regions 248. Candidate mesh regions 246 can be replaced with simplified geometry that is suitable for traditional fabrication, while complex mesh regions 248 are more suitable for additive fabrication. The operation of geometry classifier 200 is described in greater detail below in conjunction with FIGS. 3A-3C.

Seed identifier 210 processes each candidate mesh region 246 identified by geometry classifier 200 and identifies a seed point 212 for each such region where geometry simplification can be initialized. Seed identifier 212 implements a multi-step geometric approach that is described in greater detail below in conjunction with FIGS. 4A-4F.

Based on seed point 212, centerline generator 220 performs a multi-step geometric approach to extend a centerline 222 along the length of each candidate mesh region 246. This centerline forms the basis for further geometric simplification. The operation of centerline generator 220 is described in greater detail below in conjunction with FIGS. 5A-5C.

Cross section approximator 230 analyzes each candidate mesh region 246 based on centerline 222 and then generates a set of cross sections 232. Cross section approximator 230 then produces an average cross section 234 based on the set of cross sections 232. Average cross section 234 can be extruded along centerline 222 to produce a simplified version of candidate mesh region 246. The operation of cross section approximator 230 is described in greater detail below in conjunction with FIGS. 6A-6D.

Geometry modifier 240 then generates hybrid 3D mesh 270 that includes complex mesh regions 248 originally found in 3D mesh 244, as well as simplified mesh regions 242 generated via the process described above. Based on hybrid mesh 270, design engine 142 causes traditional fabrication device 150 and additive fabrication device 160 to fabricate hybrid 3D structure 170.

An advantage of the approach discussed herein is that traditional fabrication techniques can be leveraged to efficiently fabricate certain portions of hybrid mesh 270, while additive fabrication techniques can be conservatively applied to fabricate other portions of that mesh. Distributing fabrication to different devices in this manner allows 3D meshes produced via generative design to be fabricated quickly and with low cost.

Exemplary Mesh Simplification

Figure 3A:
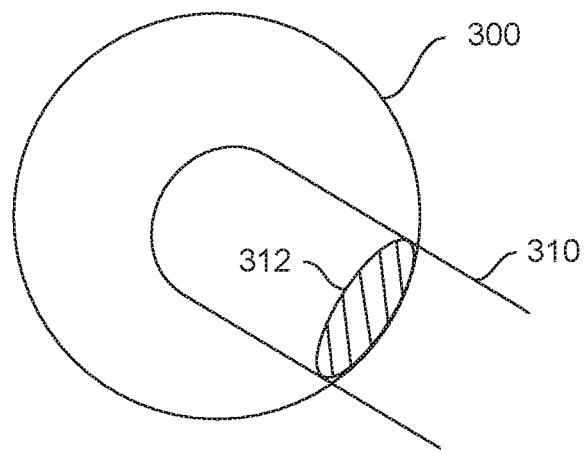
FIGS. 3A-3C illustrate how the design engine of FIGS. 1-2 identifies regions of a 3D mesh to simplify, according to various embodiments of the present invention.
Figure 3B:
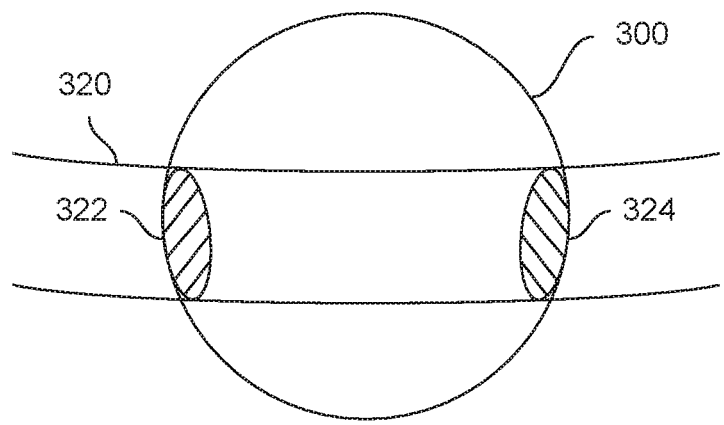
Figure 3C:
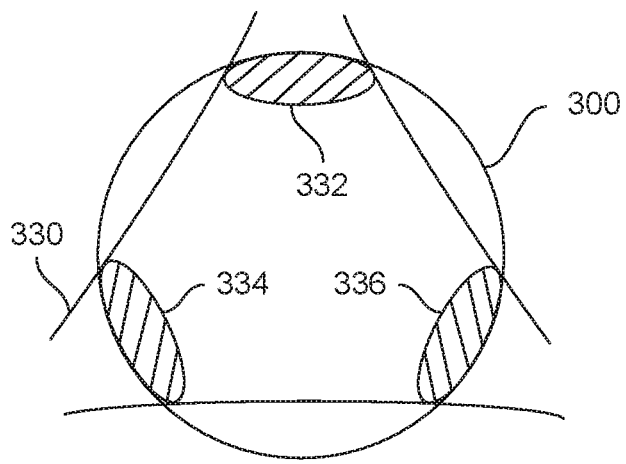

FIGS. 3A-3C illustrate how the design engine of FIGS. 1-2 identifies regions of a 3D mesh to simplify, according to various embodiments of the present invention. As shown in FIGS. 3A-3C, geometry classifier 200 within design engine 142 classifies different regions of a 3D mesh based on the number of intersections between those regions and a sphere 300. For example, geometry classifier 200 classifies an end-cap region 310 of a 3D mesh based on that region intersecting sphere 300 at a single intersection zone 312. Similarly, geometry classifier 200 classifies a tubular region of the 3D mesh based on that region intersecting sphere 300 at two intersection zones, 322 and 324. Likewise, geometry classifier 200 classifies a branching region 330 of the 3D mesh based on that region intersecting sphere 300 at three intersection zones, 332, 334, and 336.

As a general matter, the number of intersection zones corresponds to the particular class of region. However, classifier 200 may additionally apply other classification criteria. For example, to classify tubular region 320, geometry classifier 200 may also determine that intersection zones 322 and 324 are approximately equal in size and reside on opposite sides of sphere 300.

Geometry classifier 200 may perform the above classification techniques with a range of spheres 300 having different sizes. Geometry classifier may also adjust the size of sphere 300 dynamically based on various geometrical characteristics of the 3D mesh, including average triangle edge length within sphere 300, among other things. Geometry classifier 200 iteratively scans all regions of the 3D mesh and assigns a class to each such region. Then, geometry classifier 200 extracts all tubular regions 320 for further processing and, ultimately, simplification.

FIGS. 4A-4F illustrate how the design engine of FIGS. 1-2 begins simplifying a complex region of a 3D mesh, according to various embodiments of the present invention. FIGS. 4A-4F generally set forth a geometrical procedure according to which the seed point is identified.

Figure 4A:
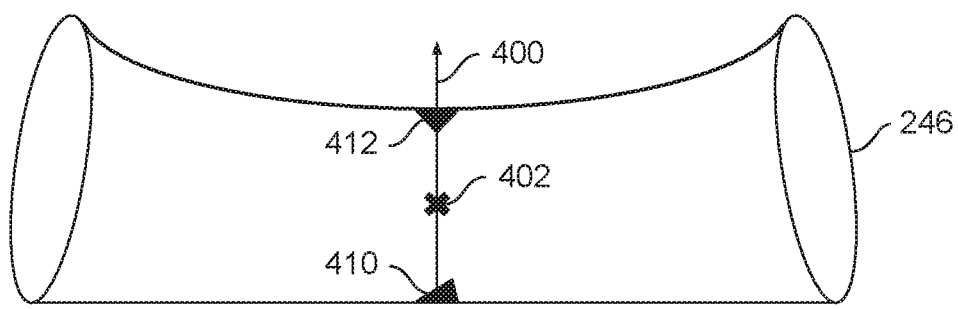
FIGS. 4A-4F illustrate how the design engine of FIGS. 1-2 begins simplifying a complex region of a 3D mesh, according to various embodiments of the present invention.

As shown in FIG. 4A, seed identifier 210 within design engine 142 projects a ray 400 through candidate mesh region 246. Candidate mesh region 246 is generally tubular in shape and identified as such via the classification operation described in conjunction with FIGS. 3A-3C. Seed identifier 210 projects ray 400 through two triangles 410 and 412 that reside on opposing sides of candidate mesh region 246. Seed identifier 210 then computes midpoint 402 of ray 400.

Figure 4B:
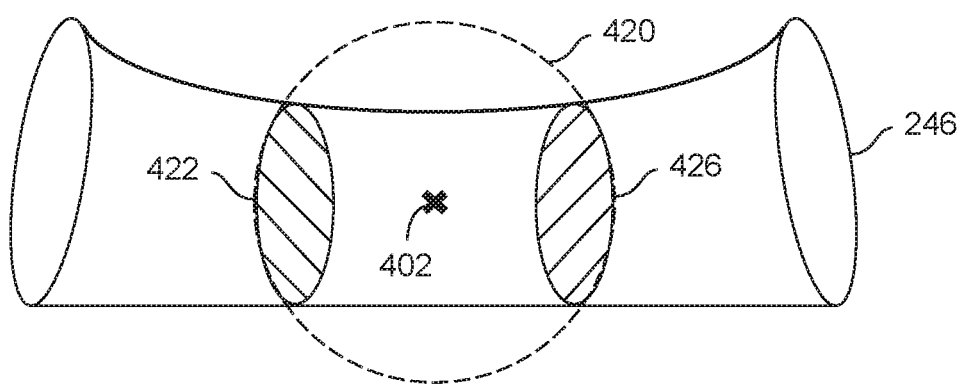

As shown in FIG. 4B, seed identifier then generates a sphere 420 centered on midpoint 402 and intersecting candidate mesh region 246 at intersection zones 422 and 426. Seed identifier 210 may generate sphere 420 having an initial radius that is based on geometrical properties of candidate mesh region 246. For example, seed identifier 210 could generate sphere 300 having initial radius equal to the distances between triangles 410 and 412 of FIG. 4A, among other properties. In one embodiment, seed identifier 210 also determines whether the ratio between areas of intersection zones 422 and 426 exceeds a threshold. If that ratio does, in fact, exceed the threshold, then seed identifier 210 may re-initiate the above process at a different position along candidate mesh region 246.

Figure 4C:
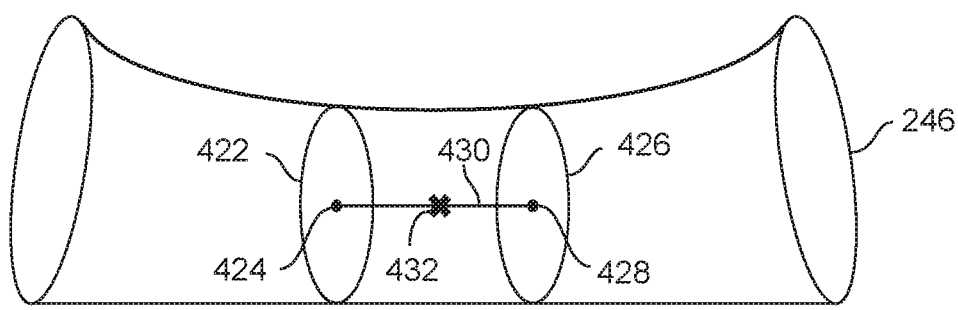

As shown in FIG. 4C, seed identifier 210 then computes centroid 424 of intersection zone 422 and centroid 426 of intersection zone 428. Seed identifier 210 then generates line segment 430 coupling these two centroids together, and computes midpoint 423 of this line segment.

Figure 4D:
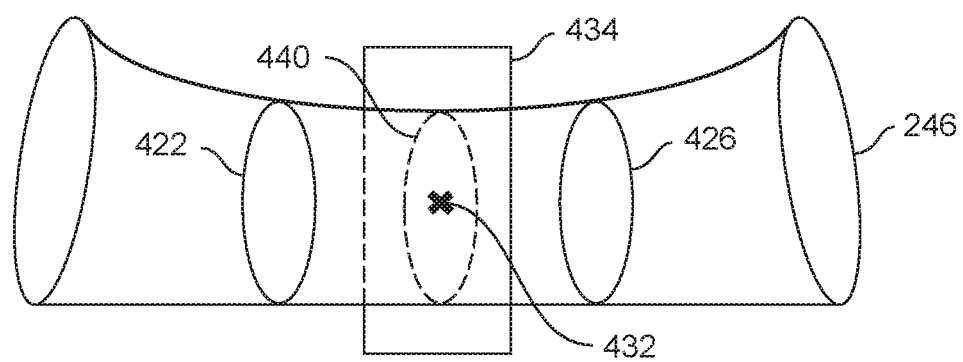

As shown in FIG. 4D, seed identifier 210 then computes the intersection between a plane 434 and candidate mesh region 246 at midpoint 432. This intersection is shown as intersection zone 440. Seed identifier 210 determines the orientation of plane 434 based on the orientations of intersection zones 422 and 426. For example, seed identifier 210 could compute the average angle of intersection zones 422 and 426, and then generate plane 434 having that same angle.

Figure 4E:
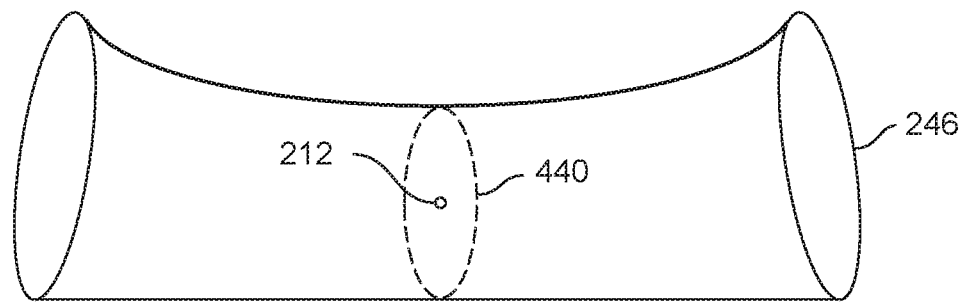
Figure 4F:
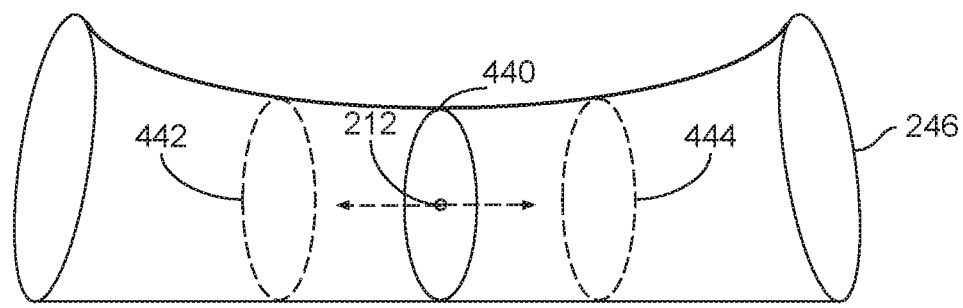

As shown in FIG. 4E, upon generating intersection zone 440, seed identifier 210 then computes the centroid of intersection zone 440, shown as seed point 212. Then, as shown in FIG. 4F, seed identifier 210 may generate one or more additional intersection zones 442 or 444 based on seed point 212. With multiple such zones, centerline generator 220 then iteratively grows a centerline along the length of candidate mesh region 246, as described in greater detail below in conjunction with FIGS. 5A-5C.

Figure 5A:
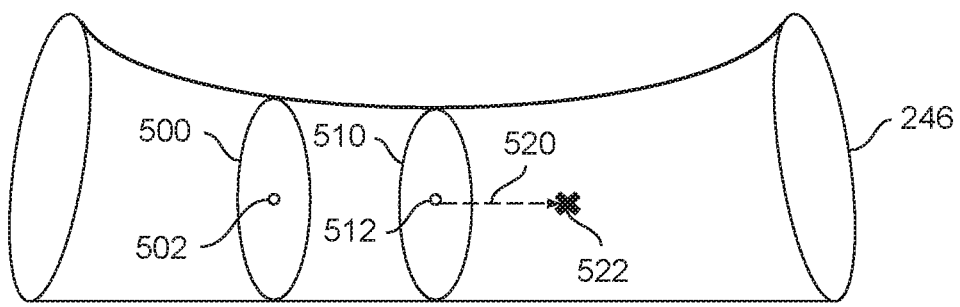
FIGS. 5A-5C illustrate how the design engine of FIGS. 1-2 generates a centerline for simplifying a complex region of a 3D mesh, according to various embodiments of the present invention.
Figure 5B:
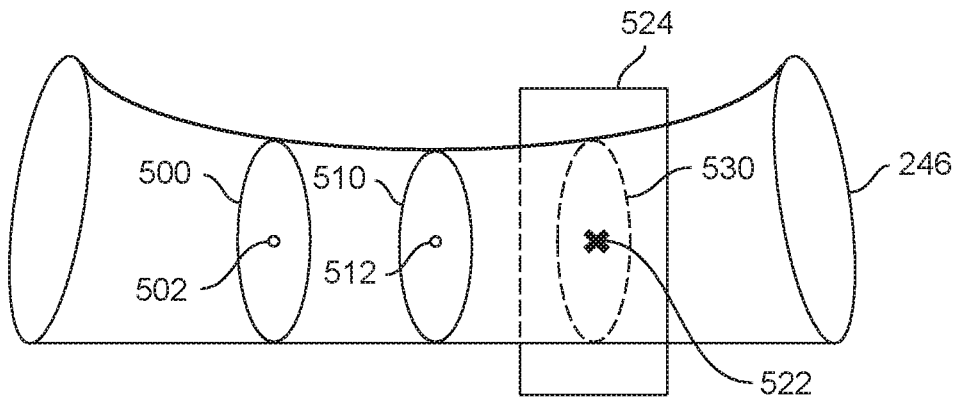
Figure 5C:
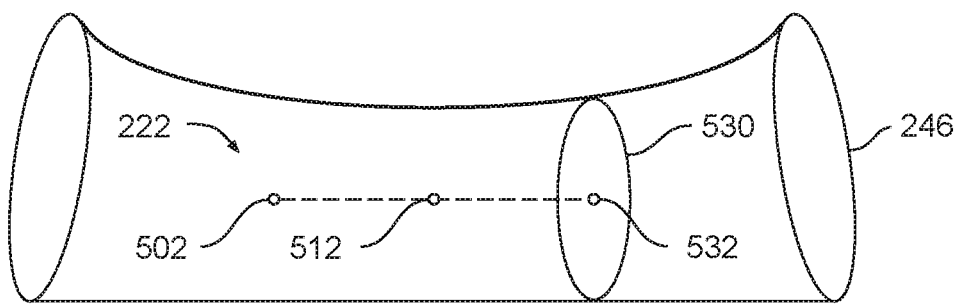

FIGS. 5A-5C illustrate how the design engine of FIGS. 1-2 generates a centerline for simplifying a complex region of a 3D mesh, according to various embodiments of the present invention. Centerline generator 220 within design engine 142 generally implements the geometric procedure set forth below. In doing so, centerline generator 220 analyzes two pre-existing intersection zones of candidate mesh region 246 and then extrapolates an additional centerline point based on those two zones.

For example, as shown in FIG. 5A, centerline generator 220 identifies two intersection zones 500 and 510 having centroids 502 and 512, respectively. Intersection zones 500 and 510 could be derived from any of the intersection zones discussed thus far. Centroids 502 and 512 of those intersection zones may form a portion of centerline 222. Based on these two centroids, centerline generator 220 computes a difference vector 520. Centerline generator 220 may determine a magnitude for difference vector 520 based on geometrical properties of candidate mesh region 246. For example, centerline generator 220 could set the magnitude of difference vector 520 in proportion to the average triangle edge length associated with intersection zones 500 and 510. Based on difference vector 520, centerline generator 220 determines an intermediate centerline point 522.

As shown in FIG. 5B, centerline generator 220 then computes the intersection between a plane 524 and intermediate centerline point 522, shown as intersection zone 530. Finally, as shown in FIG. 5C, centerline generator 220 determines centroid 532 of intersection zone 530. Centroid 532 is included in centerline 222, along with centroids 502 and 512. In this manner, centerline generator 220 may grow centerline 222 based on pre-existing intersection zones seeded based on seed point 212.

Referring generally to FIGS. 5A-5C, the procedure discussed above can be applied iteratively to grow centerline 222 along arbitrary lengths of candidate mesh region 246. Once centerline generator 220 has generated centerline 222 in this manner, centerline generator 220 may perform several different postprocessing steps with centerline 222. Centerline generator 220 may filter out centerline points with large angular jumps compared to previous centerline points. Centerline generator 220 may also filter out centerline points with large jumps in the cross section of candidate mesh region 246. Centerline generator 220 may also replace centerline 222 with a b-spline interpolation. Further, centerline generator 220 may reduce centerline 222 to specific critical points and eliminate other non-critical points. Based on the finalized centerline 222, cross section approximator 230 performs additional processing steps to simplify the geometry associated with candidate mesh region 246.

Figure 6A:
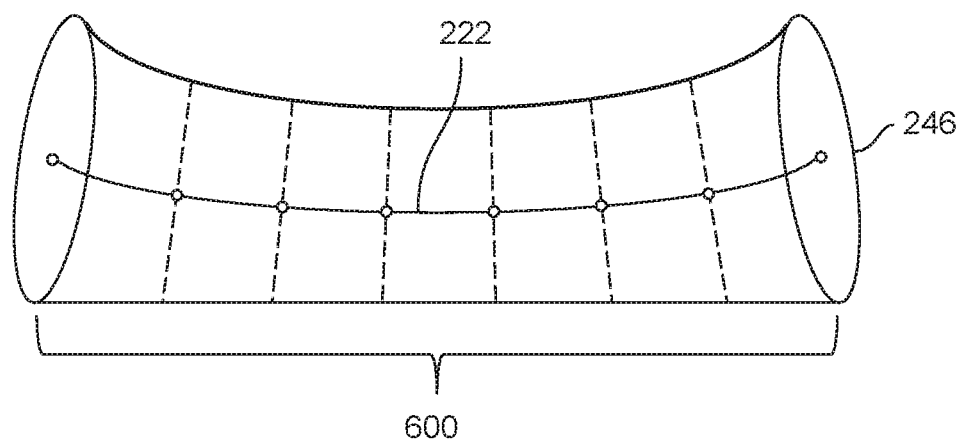
FIGS. 6A-6D illustrate how the design engine of FIGS. 1-2 generates simplified geometry to replace a complex region of a 3D mesh, according to various embodiments of the present invention.

FIGS. 6A-6D illustrate how the design engine of FIGS. 1-2 generates simplified geometry to replace a complex region of a 3D mesh, according to various embodiments of the present invention. As shown in FIG. 6A, cross section approximator 230 within design engine 142 generates a set 600 of cross sections along centerline 222 of candidate mesh region 246. To generate a given cross section, cross section approximator 230 intersects a plane with centerline 222 at a particular centerline point orthogonally to centerline 222 and through triangle centers of candidate mesh region 246.

Figure 6B:
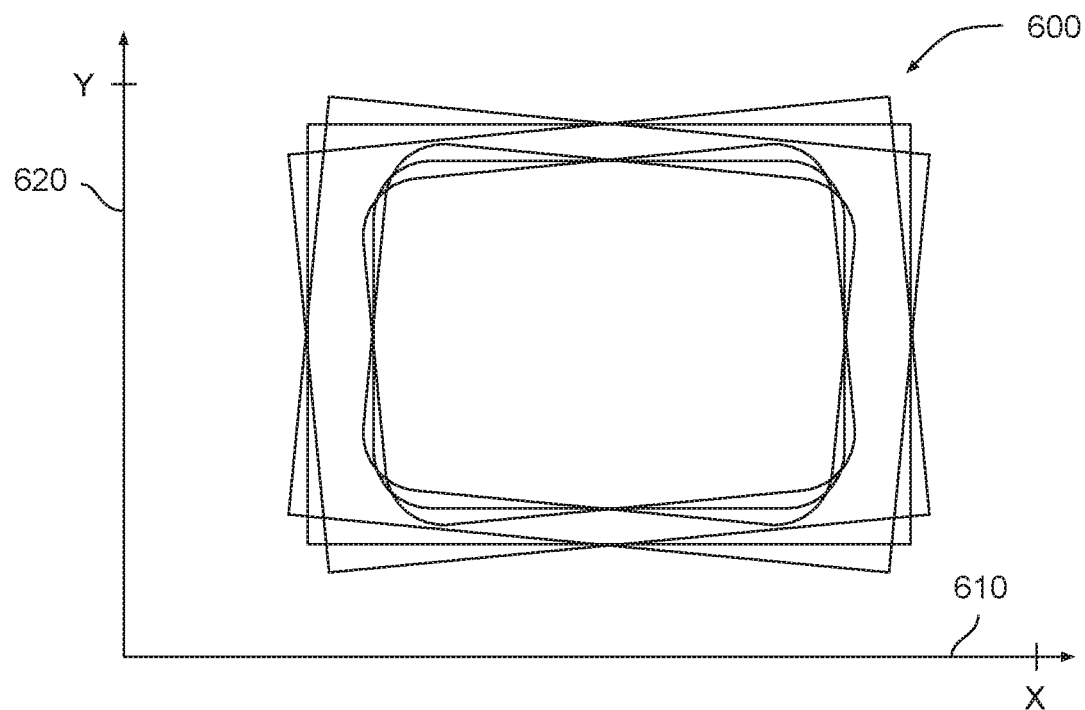
Figure 6C:
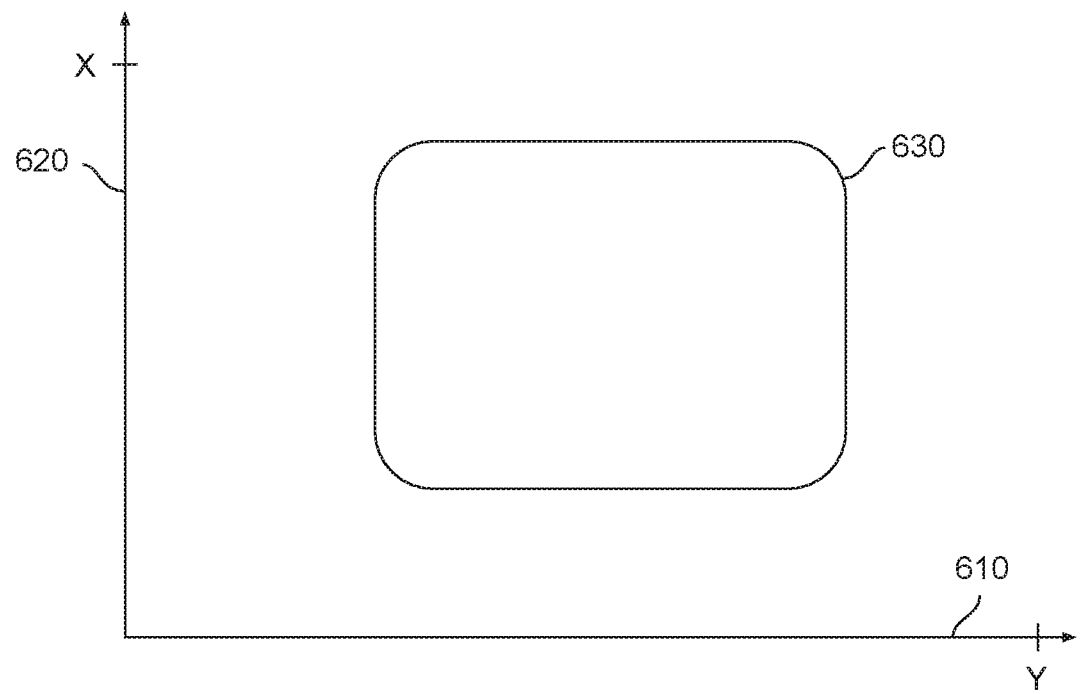
Figure 6D:
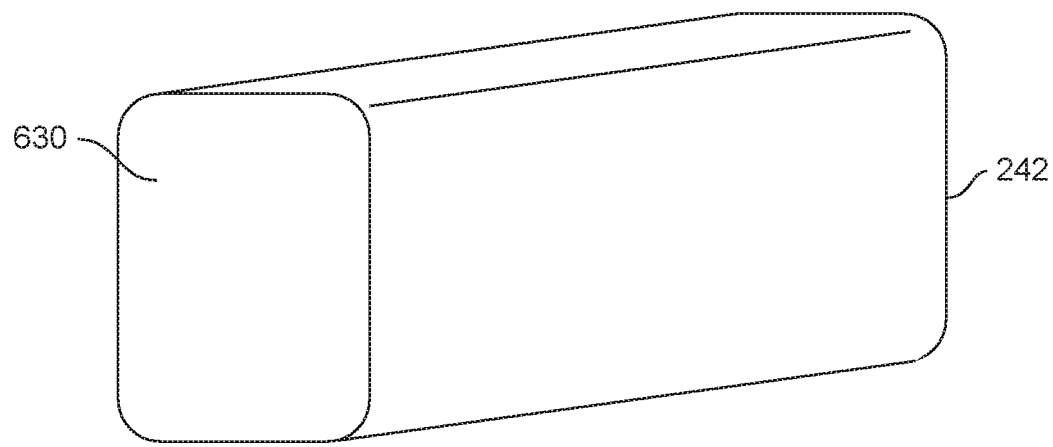

As shown in FIG. 6B, cross section approximator 230 then compares set 600 of cross sections. In doing so, cross section approximator 230 may generate an oriented bounding box around each cross section and then plot these bounding boxes and cross sections against one another on X and Y axes 610 and 620, respectively. Cross section approximator 230 may then analyze the aspect ratio and the filling ratio of each cross section. Based on this analysis, cross section approximator 230 may classify each cross section as a box, a rectangle, a circle, or another geometric shape. Based on the number of cross sections found in each different class, cross section approximator 230 creates an average cross section for the entire candidate mesh region 246, shown in FIG. 6C as cross section 630. Finally, cross section approximator 230 generates simplified geometry 242 by extruding cross section 630 along the length of centerline 222.

Figure 7A:
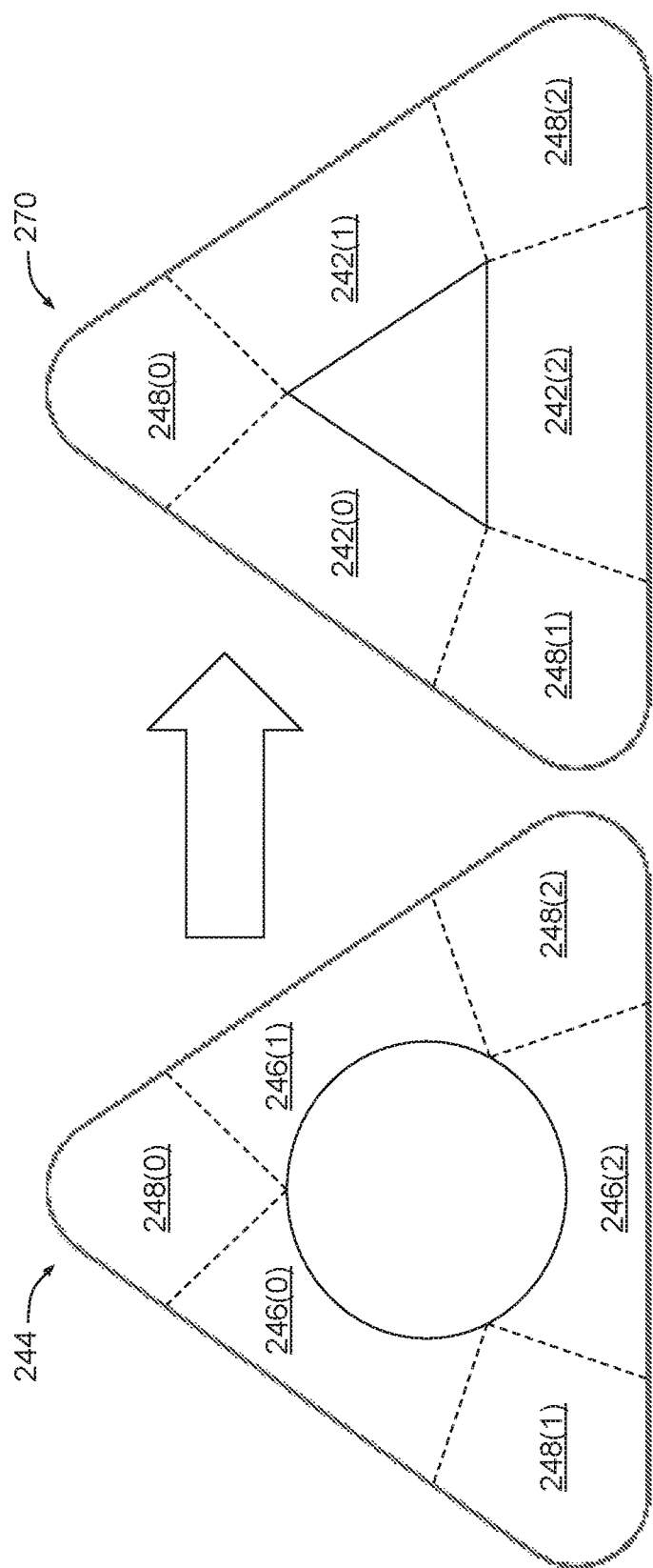

Geometry modifier 240 within design engine 142 may then update 3D mesh 244 with the simplified geometry generated via the process described above. Geometry modifier 240 may also retriangulate portions of 3D mesh 244 to provide clean joins between complex mesh regions and simplified mesh regions. In one embodiment, geometry modifier 240 may enforce certain constraints on which regions of 3D mesh 244 can be replaced and which regions cannot, regardless of geometry. For example, geometry modifier 240 could prevent tubular regions having less than a minimum length from being replaced. FIGS. 7A-7B illustrate exemplary geometry simplified via the techniques described thus far.

FIGS. 7A-7B illustrate various exemplary designs having simplified geometry, according to various embodiments of the present invention. As shown in FIG. 7A, 3D mesh 244 initially includes regions 246 that are candidates for simplification by virtue of having approximately tubular cross sections. 3D mesh 244 also initially includes complex regions 248 that cannot easily be simplified and therefore are not candidates for simplification. Design engine 142 performs the simplification process described above to generate hybrid 3D mesh 270, including complex regions 248 as well as simplified regions 242. Simplified regions 242 have regular cross sections and can be formed via a traditional extrusion process, among other traditional fabrication processes.

FIG. 7B illustrates a more complex 3D mesh that can be simplified in the manner described. As shown, 3D mesh 700 initially has numerous amorphous filaments, as commonly found with designs generated via generative design and/or topology optimization. However, after simplification, many of these filaments are replaced with cylindrical structures included in simplified 3D mesh 710.

After design engine 142 generates a hybrid 3D mesh via the above techniques, design engine 142 may perform a number of different post-processing steps. Those post processing steps may include simulating structural attributes of the hybrid 3D mesh, optimizing the geometry of simplified mesh regions in that hybrid mesh, mapping simplified mesh regions to standardized parts, merging proximate co-linear tubular regions, applying lattice optimization to complex mesh regions, estimating fabrication cost, optimizing the hybridization to minimize cost, optimizing simplification to reduce print area for additive fabrication, and potentially others.

Mesh Simplification Procedures

Figure 8:
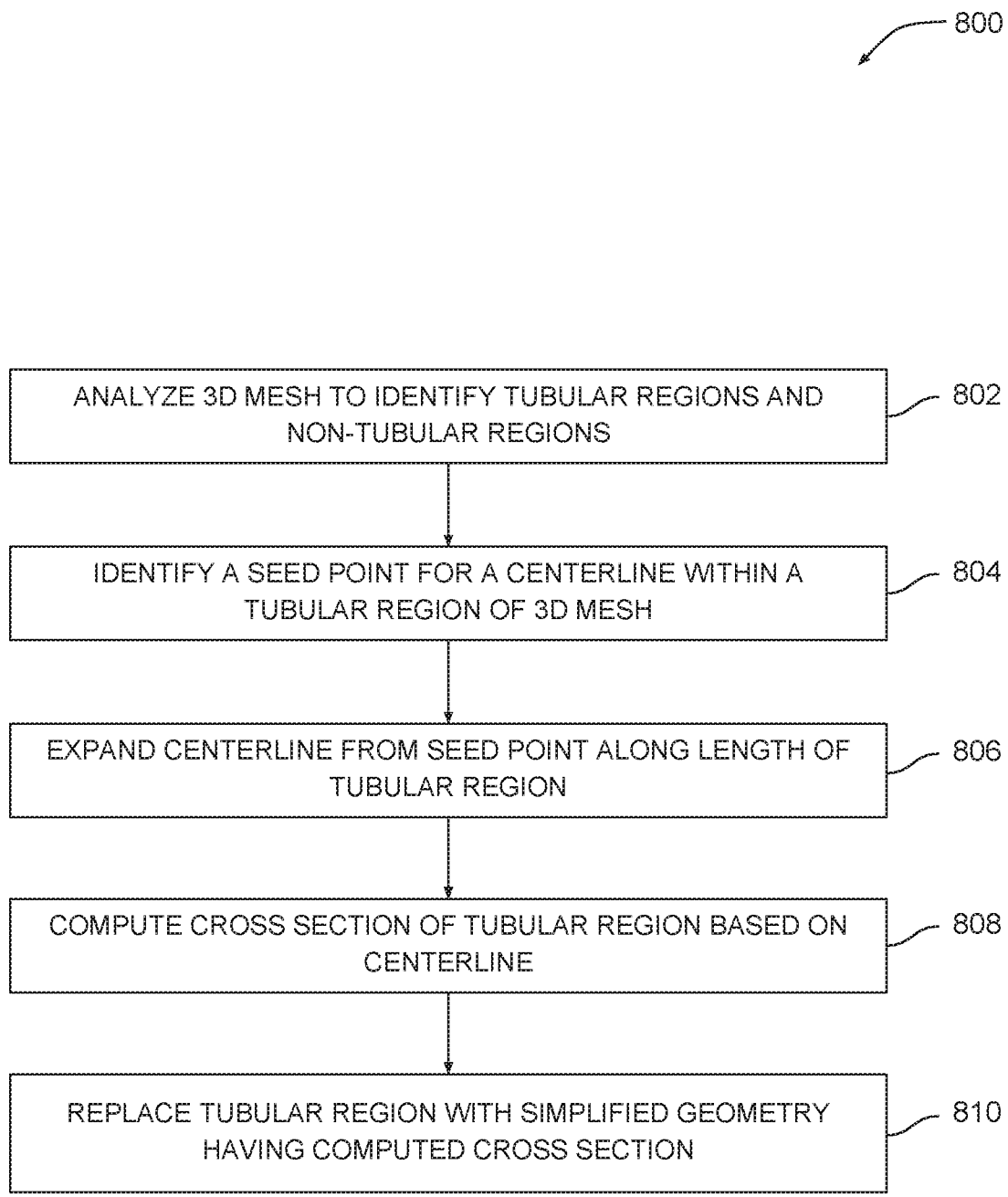
FIG. 8 is a flow diagram of method steps for simplifying a tubular region of a 3D mesh, according to various embodiments of the present invention.

FIG. 8 is a flow diagram of method steps for simplifying a tubular region of a 3D mesh, according to various embodiments of the present invention. Although the method steps are described in conjunction with the systems of FIGS. 1-7B, persons skilled in the art will understand that any system configured to perform the method steps, in any order, is within the scope of the present invention.

As shown, a method 800 begins at step 802, where geometry classifier 200 within design engine 142 analyzes a 3D mesh to identify tubular regions and non-tubular regions. The tubular regions of the 3D mesh are candidates for simplification, whereas the non-tubular regions are not candidates for simplification. Geometry classifier 200 implements the sphere intersection approach discussed above in conjunction with FIGS. 3A-3B to classify the tubular and non-tubular regions of the 3D mesh.

At step 804, seed identifier 210 within design engine 142 identifies a seed point for a centerline within a tubular region of the 3D mesh. Seed identifier 210 performs the technique described above in conjunction with FIGS. 4A-4F to perform step 804. That technique is also described below in conjunction with FIG. 9.

At step 806, centerline generator 220 within design engine 142 expands a centerline from the seed point along the length of the tubular region. Centerline generator 220 implements the approach discussed above in conjunction with FIGS. 5A-5C to perform step 806. That approach is also described below in conjunction with FIG. 10.

At step 808, cross section approximator 230 computes the cross section of the tubular region along the centerline to generate an average cross section. The average cross section can then be extruded along the centerline to produce simplified geometry. In doing so, cross section approximator performs the approach discussed above in conjunction with FIGS. 6A-6D and also described in greater detail below in conjunction with FIG. 11. At step 810, geometry modifier 240 replaces the tubular region with simplified geometry having the computed cross section.

Figure 9:
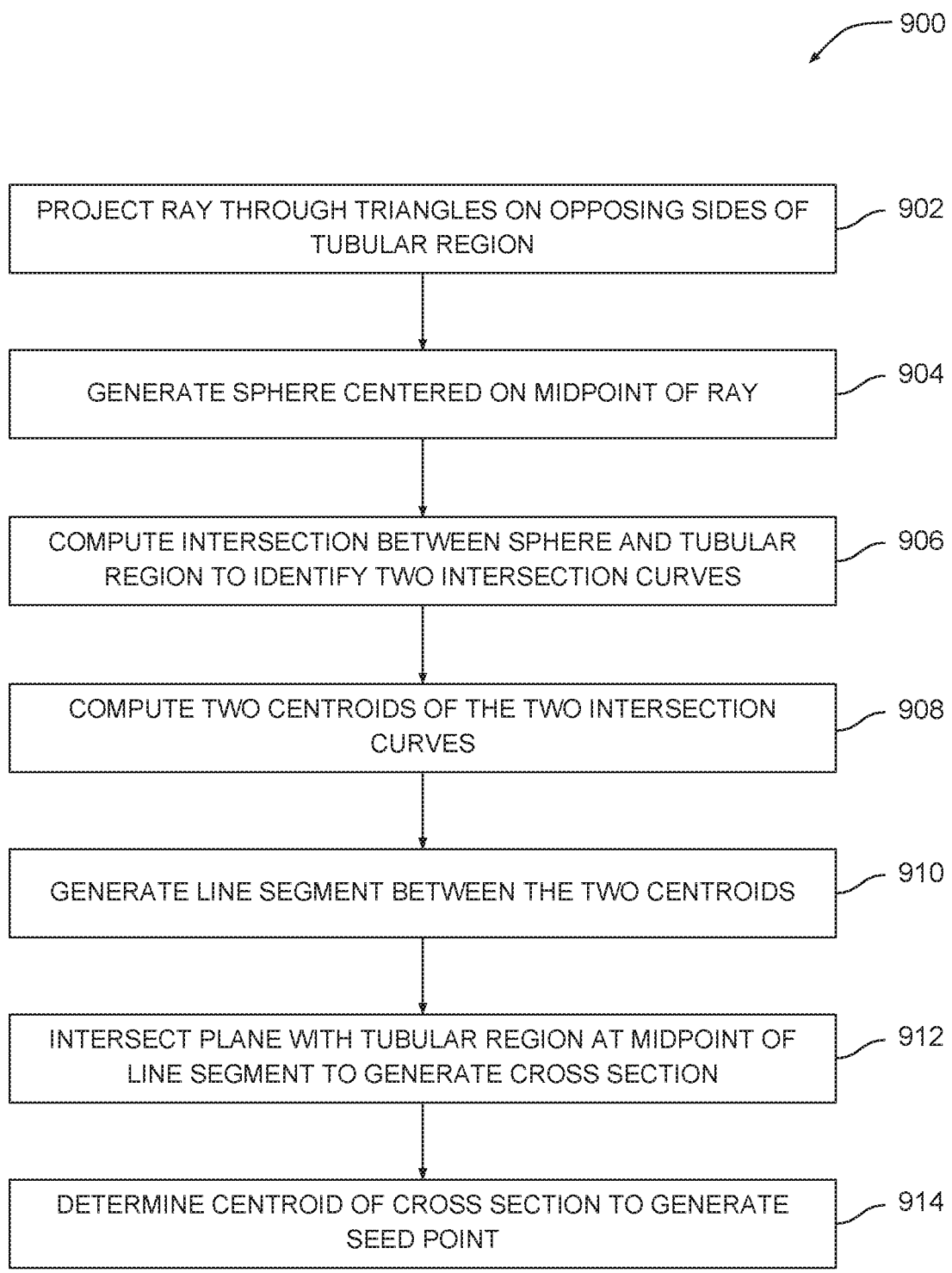
FIG. 9 is a flow diagram of method steps for identifying a seed point within a tubular region of a 3D mesh, according to various embodiments of the present invention.

FIG. 9 is a flow diagram of method steps for identifying a seed point within a tubular region of a 3D mesh, according to various embodiments of the present invention. Although the method steps are described in conjunction with the systems of FIGS. 1-7B, persons skilled in the art will understand that any system configured to perform the method steps, in any order, is within the scope of the present invention.

As shown, a method 900 begins at step 902, where seed identifier 210 projects a ray through triangles on opposing sides of the identified tubular region. At step 904, seed identifier 210 generates a sphere centered on the midpoint of the ray. At step 906, seed identifier 210 computes the intersection between the sphere and the tubular region to identify two intersection curves. At step 908, seed identifier 210 computes two centroids of the two intersection curves. At step 910, seed identifier 210 generates a line segment between the two centroids. At step 912, seed identifier 210 intersects a plane with the tubular region at the midpoint of line segment to generate a cross section. At step 914, seed identifier 210 determines the centroid of the cross section to generate a seed point. The seed point may be extrapolated to generate another seed point, and the two seed points can then be extended to form a centerline, as described below in conjunction with FIG. 10.

Figure 10:
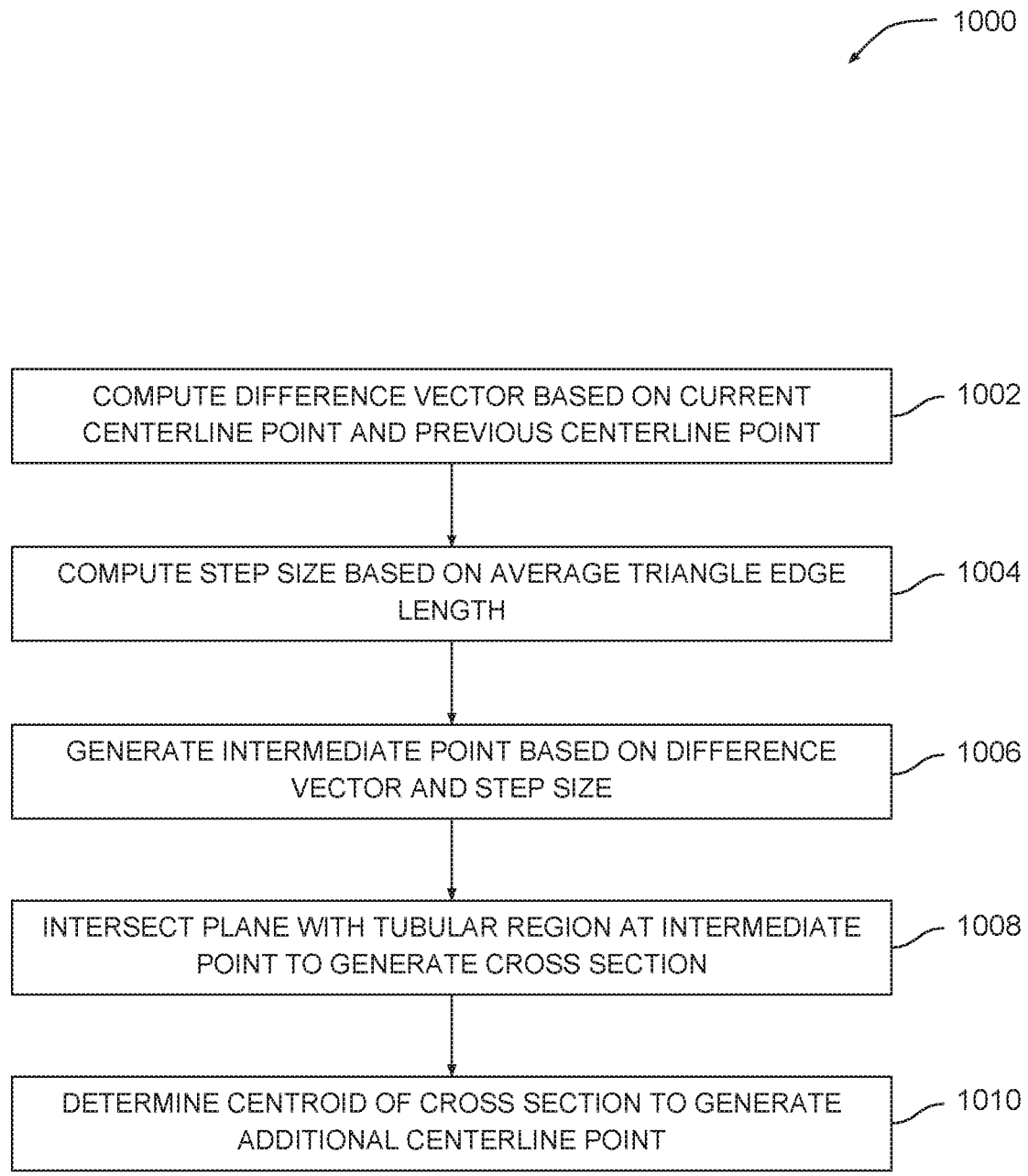
FIG. 10 is a flow diagram of method steps for generating a centerline within a tubular region of a 3D mesh, according to various embodiments of the present invention.

FIG. 10 is a flow diagram of method steps for generating a centerline within a tubular region of a 3D mesh, according to various embodiments of the present invention. Although the method steps are described in conjunction with the systems of FIGS. 1-7B, persons skilled in the art will understand that any system configured to perform the method steps, in any order, is within the scope of the present invention.

As shown, a method 1000 begins at step 1002, where centerline generator 220 computes a difference vector based on a current centerline point and a previous centerline point. At step 1004, centerline generator 220 computes a step size based on the average triangle edge length. At step 1006, centerline generator 220 generates an intermediate centerline point based on the difference vector and the step size. At step 1008, centerline generator 220 intersects a plane with the tubular region at the intermediate point to generate a cross section. At step 1010, centerline generator 220 determines the centroid of the cross section to generate an additional centerline point.

Figure 11:
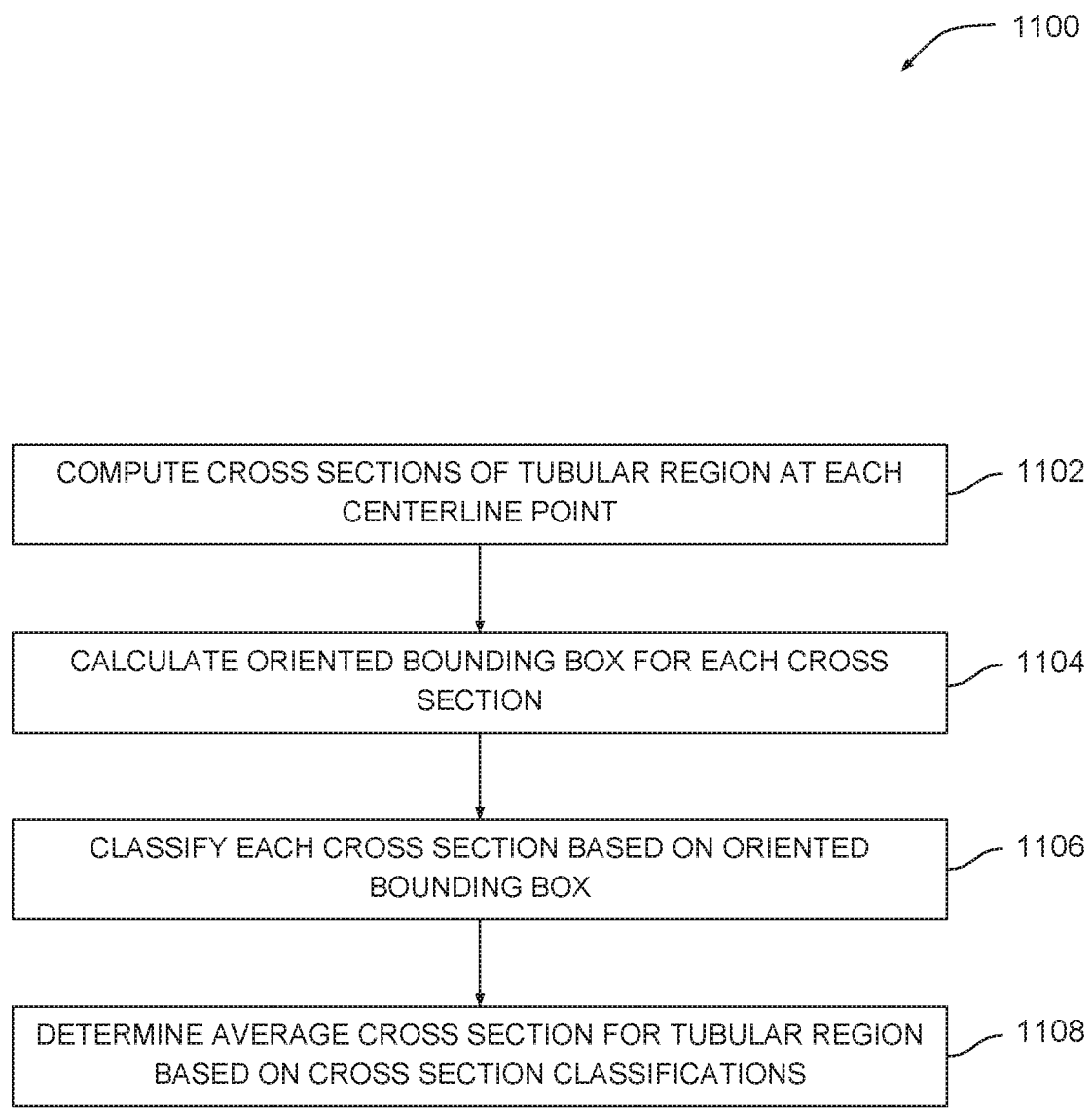
FIG. 11 is a flow diagram of method steps for generating a cross section for replacing a tubular region of a 3D mesh, according to various embodiments of the present invention.

FIG. 11 is a flow diagram of method steps for generating a cross section for replacing a tubular region of a 3D mesh, according to various embodiments of the present invention. Although the method steps are described in conjunction with the systems of FIGS. 1-7B, persons skilled in the art will understand that any system configured to perform the method steps, in any order, is within the scope of the present invention.

As shown, a method 1100 begins at step 1102, cross section approximator 230 computes a set of cross sections of the tubular region at each centerline point. At step 1106, cross section approximator 230 calculates an oriented bounding box for each cross section in the set. At step 1108, cross section approximator 230 classifies each cross section based on an oriented bounding box. At step 1110, cross section approximator 230 determines an average cross section for the tubular region based on the determined cross section classifications. In doing so, cross section approximator 230 may determine the most common class assigned to those cross sections as the "average" cross section.

In sum, a design engine analyzes a complex polygonal mesh to identify regions of that mesh that can be simplified. The design engine then replaces those identified regions with simplified geometry that is more easily fabricated using traditional techniques. The remaining complex regions of the mesh are fabricated using additive fabrication techniques. The design engine interacts with both a traditional fabrication device and an additive fabrication device to fabricate the simplified and complex regions of the mesh, respectively. In this manner, a hybrid 3D structure is generated that includes both simplified geometry and complex geometry.

An advantage of the techniques set forth above is that complex polygonal meshes generated via generative design can be simplified to facilitate more efficient fabrication. These techniques improve the operation of generative design applications because the generation of these simpler meshes reduces reliance on expensive and slow additive manufacturing devices.

1. Some embodiments of the invention include a computer-implemented method for generating a polygonal mesh, the method comprising: determining that a first region included in an initial mesh meets a geometric criterion, determining a representative cross section along a centerline associated with the first region, generating simplified geometry for the initial mesh based on the representative cross section, and replacing the first region with the simplified geometry in the initial mesh to generate the polygonal mesh.

2. The computer-implemented method of clause 1, wherein determining that the first region meets the geometric criterion comprises: generating a sphere centered within the first region, and determining that two portions of the initial mesh intersect the sphere on opposing sides of the sphere.

3. The computer-implemented method of any of clauses 1 and 2, further comprising determining that a second region included in the initial mesh does not meet the geometric criterion by: generating a sphere centered within the second region, and determining that the number of portions of the initial mesh that intersect the sphere is not equal to two.

4. The computer-implemented method of any of clauses 1, 2, and 3, further comprising generating the centerline by extrapolating one or more centerline points based on a seed point that resides within the first region.

5. The computer-implemented method of any of clauses 1, 2, 3, and 4, further comprising generating the seed point by: projecting a ray from a first polygon to a second polygon, wherein the first polygon and the second polygon reside in the first region, computing a first midpoint along the ray between the first polygon and the second polygon, generating a sphere centered at the first midpoint, determining a first intersection zone where the sphere intersects the first region, computing a first centroid associated with the first intersection zone, determining a second intersection zone where the sphere intersects the second region, computing a second centroid associated with the second intersection zone, generating a line segment from the first centroid to the second centroid, computing a second midpoint associated with the line segment, generating a third cross section by transecting the first region at the second midpoint, and computing a third centroid associated with the third cross section to generate the seed point.

6. The computer-implemented method of any of clauses 1, 2, 3, 4, and 5, further comprising generating at least one centerline point by: generating a first cross section by transecting the first region proximate to the seed point, computing a first centroid based on the first cross section, generating a difference vector between the seed point and the first centroid, extending the difference vector from the first centroid to an intermediate point, generating a second cross section by transecting the first region at the intermediate point, and computing a second centroid associated with the second cross section to generate the at least one centerline point, wherein the centerline includes the seed point and the at least one centerline point.

7. The computer-implemented method of any of clauses 1, 2, 3, 4, 5, and 6, further comprising performing one or more post-processing operations that include replacing at least a portion of the centerline with a b-spline or a line segment.

8. The computer-implemented method of any of clauses 1, 2, 3, 4, 5, 6, and 7, wherein determining the representative cross section comprises: transecting the first region at a set of positions along the centerline to generate a set of cross sections, assigning a class to each cross section, determining which class is the most commonly assigned class across the set of cross sections, and designating the most commonly assigned class as the representative cross section.

9. The computer-implemented method of any of clauses 1, 2, 3, 4, 5, 6, 7, and 8, wherein generating simplified geometry for the initial mesh comprises extruding the representative cross section along the centerline.

10. Some embodiments of the invention include a non-transitory computer-readable medium storing program instructions that, when executed by a processor cause the processor to generate a polygonal mesh by performing the steps of: determining that a first region included in an initial mesh meets a geometric criterion, determining a representative cross section along a centerline associated with the first region, generating simplified geometry for the initial mesh based on the representative cross section, and replacing the first region with the simplified geometry in the initial mesh to generate the polygonal mesh.

11. The non-transitory computer-readable medium of clause 10, wherein the step of determining that the first region meets the geometric criterion comprises: generating a sphere centered within the first region, determining that two portions of the initial mesh intersect the sphere on opposing sides of the sphere, and determining that a ratio between the two portions of the initial mesh falls beneath a threshold.

12. The non-transitory computer-readable medium of any of clauses 10 and 11, further comprising the step of determining that a second region included in the initial mesh does not meet the geometric criterion by: generating a sphere centered within the second region, determining that two portions of the initial mesh intersect the sphere on opposing sides of the sphere, and determining that a ratio between the two portions of the initial mesh exceeds a threshold.

13. The non-transitory computer-readable medium of any of clauses 10, 11, and 12, further comprising the step of generating the centerline by extrapolating one or more centerline points based on a seed point that resides within the first region.

14. The non-transitory computer-readable medium of any of clauses 10, 11, 12, and 13, further comprising generating the seed point by: projecting a ray from a first polygon to a second polygon, wherein the first polygon and the second polygon reside in the first region, computing a first midpoint along the ray between the first polygon and the second polygon, generating a sphere centered at the first midpoint, determining a first intersection zone where the sphere intersects the first region, computing a first centroid associated with the first intersection zone, determining a second intersection zone where the sphere intersects the second region, computing a second centroid associated with the second intersection zone, generating a line segment from the first centroid to the second centroid, computing a second midpoint associated with the line segment, generating a third cross section by transecting the first region at the second midpoint, and computing a third centroid associated with the third cross section to generate the seed point.

15. The non-transitory computer-readable medium of any of clauses 10, 11, 12, 13, and 14, further comprising generating at least one centerline point by: generating a first cross section by transecting the first region proximate to the seed point, computing a first centroid based on the first cross section, generating a difference vector between the seed point and the first centroid, extending the difference vector from the first centroid to an intermediate point, generating a second cross section by transecting the first region at the intermediate point, and computing a second centroid associated with the second cross section to generate the at least one centerline point, wherein the centerline includes the seed point and the at least one centerline point.

16. The non-transitory computer-readable medium of any of clauses 10, 11, 12, 13, 14, and 15, further comprising the step of performing one or more post-processing operations that include replacing at least a portion of the centerline with a b-spline or a line segment.

17. The non-transitory computer-readable medium of any of clauses 10, 11, 12, 13, 14, 15, and 16, wherein the step of determining the representative cross section comprises: transecting the first region at a set of positions along the centerline to generate a set of cross sections, assigning a class to each cross section, determining which class is the most commonly assigned class across the set of cross sections, and designating the most commonly assigned class as the representative cross section.

18. The non-transitory computer-readable medium of any of clauses 10, 11, 12, 13, 14, 15, 16, and 17, wherein the step of generating simplified geometry for the initial mesh comprises extruding the representative cross section along the centerline.

19. The non-transitory computer-readable medium of any of clauses 10, 11, 12, 13, 14, 15, 16, 17, and 18, further comprising the steps of: causing a first fabrication device to fabricate a first structure based on the simplified geometry, causing a second fabrication device to fabricate a second structure based on a remaining portion of the polygonal mesh, and causing the first fabrication device to interoperate with the second fabrication device to combine the first structure with the second structure.

20. Some embodiments of the invention include a system for generating a polygonal mesh, comprising: a memory storing a design engine, and a processor that, upon executing the design engine, performs the steps of: determining that a first region included in an initial mesh meets a geometric criterion, determining a representative cross section along a centerline associated with the first region, generating simplified geometry for the initial mesh based on the representative cross section, and replacing the first region with the simplified geometry in the initial mesh to generate the polygonal mesh.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating a polygonal mesh, the method comprising:
    determining that a geometry for a first region included in an initial mesh has a first shape that is not suitable for non-additive fabrication, wherein the first shape is determined based on a sphere that is centered within the first region and intersects two portions of the initial mesh on opposite sides of a center of the sphere;
    determining a representative cross section along a centerline associated with the first region;
    in response to determining that the geometry for the first region has the first shape that is not suitable for non-additive fabrication, generating a modified geometry for the first region that is suitable for non-additive fabrication based on the representative cross section; and
    replacing the first region with the modified geometry in the initial mesh to generate the polygonal mesh.

2. The computer-implemented method of claim 1, further comprising determining that a second region included in the initial mesh does not meet a geometric criterion by:
    generating a sphere centered within the second region; and
    determining that the number of contiguous portions of the initial mesh that intersect the sphere is not equal to two.

3. The computer-implemented method of claim 1, further comprising generating the centerline by extrapolating one or more centerline points based on a seed point that resides within the first region.

4. The computer-implemented method of claim 3, further comprising generating the seed point by:
    projecting a ray from a first polygon to a second polygon, wherein the first polygon and the second polygon reside in the first region;
    computing a first midpoint along the ray between the first polygon and the second polygon;
    generating a sphere centered at the first midpoint;
    determining a first intersection zone where the sphere intersects the first region;
    computing a first centroid associated with the first intersection zone;
    determining a second intersection zone where the sphere intersects the first region;
    computing a second centroid associated with the second intersection zone;
    generating a line segment from the first centroid to the second centroid;
    computing a second midpoint associated with the line segment;
    generating a third cross section by transecting the first region at the second midpoint; and
    computing a third centroid associated with the third cross section to generate the seed point.

5. The computer-implemented method of claim 3, further comprising generating at least one centerline point by:
    generating a first cross section by transecting the first region proximate to the seed point;
    computing a first centroid based on the first cross section;

generating a difference vector between the seed point and the first centroid;

extending the difference vector from the first centroid to an intermediate point;

generating a second cross section by transecting the first region at the intermediate point; and computing a second centroid associated with the second cross section to generate the at least one centerline point, wherein the centerline includes the seed point and the at least one centerline point.

6. The computer-implemented method of claim 1, further comprising performing one or more post-processing operations that include replacing at least a portion of the centerline with a b-spline or a line segment.

7. The computer-implemented method of claim 1, wherein determining the representative cross section comprises:

transecting the first region at a set of positions along the centerline to generate a set of cross sections;

assigning a class to each cross section;

determining which class is the most commonly assigned class across the set of cross sections; and designating the most commonly assigned class as the representative cross section.

8. The computer-implemented method of claim 1, wherein generating modified geometry for the first region comprises extruding the representative cross section along the centerline.

9. One or more non-transitory computer-readable media storing program instructions that, when executed by one or more processors cause the one or more processors to generate a polygonal mesh by performing the steps of:

determining that a geometry for a first region included in an initial mesh has a first shape that is not suitable for non-additive fabrication, wherein the first shape is determined based on a sphere that is centered within the first region and intersects two portions of the initial mesh on opposite sides of a center of the sphere;

determining a representative cross section along a centerline associated with the first region;

in response to determining that the geometry for the first region has the first shape that is not suitable for non-additive fabrication, generating a modified geometry for the first region that is suitable for non-additive fabrication based on the representative cross section; and replacing the first region with the modified geometry in the initial mesh to generate the polygonal mesh.

10. The one or more non-transitory computer-readable media of claim 9, wherein the step of determining that the first region has the first shape that is not suitable for non-additive fabrication comprises determining that a ratio between sizes of the two portions of the initial mesh falls beneath a threshold.

11. The one or more non-transitory computer-readable media of claim 9, further comprising the step of determining that a second region included in the initial mesh does not meet a geometric criterion by:

generating a sphere centered within the second region;

determining that exactly two portions of the initial mesh intersect the sphere on opposite sides of a center of the sphere; and determining that a ratio between sizes of the two portions of the initial mesh exceeds a threshold.

12. The one or more non-transitory computer-readable media of claim 9, further comprising the step of generating the centerline by extrapolating one or more centerline points based on a seed point that resides within the first region.

13. The one or more non-transitory computer-readable media of claim 12, further comprising generating the seed point by:

projecting a ray from a first polygon to a second polygon, wherein the first polygon and the second polygon reside in the first region;

computing a first midpoint along the ray between the first polygon and the second polygon;

generating a sphere centered at the first midpoint;

determining a first intersection zone where the sphere intersects the first region;

computing a first centroid associated with the first intersection zone;

determining a second intersection zone where the sphere intersects the first region;

computing a second centroid associated with the second intersection zone;

generating a line segment from the first centroid to the second centroid;

computing a second midpoint associated with the line segment;

generating a third cross section by transecting the first region at the second midpoint; and computing a third centroid associated with the third cross section to generate the seed point.

14. The one or more non-transitory computer-readable media of claim 12, further comprising generating at least one centerline point by:

generating a first cross section by transecting the first region proximate to the seed point;

computing a first centroid based on the first cross section;

generating a difference vector between the seed point and the first centroid;

extending the difference vector from the first centroid to an intermediate point;

generating a second cross section by transecting the first region at the intermediate point; and computing a second centroid associated with the second cross section to generate the at least one centerline point, wherein the centerline includes the seed point and the at least one centerline point.

15. The one or more non-transitory computer-readable media of claim 9, further comprising the step of performing one or more post-processing operations that include replacing at least a portion of the centerline with a b-spline or a line segment.

16. The one or more non-transitory computer-readable media of claim 9, wherein the step of determining the representative cross section comprises:

transecting the first region at a set of positions along the centerline to generate a set of cross sections;

assigning a class to each cross section;

determining which class is the most commonly assigned class across the set of cross sections; and designating the most commonly assigned class as the representative cross section.

17. The one or more non-transitory computer-readable media of claim 9, wherein the step of generating modified geometry for the first region comprises extruding the representative cross section along the centerline.

18. The one or more non-transitory computer-readable media of claim 9, further comprising the steps of:

causing a first fabrication device to fabricate a first structure based on the modified geometry;

causing a second fabrication device to fabricate a second structure based on a remaining portion of the polygonal mesh; and causing the first structure fabricated by the first fabrication device and the second structure fabricated by the second fabrication device to be combined.

19. A system for generating a polygonal mesh, comprising:

one or more memories storing a design engine; and one or more processors that, upon executing the design engine, performs the steps of:

determining that a geometry for a first region included in an initial mesh has a first shape that is not suitable for non-additive fabrication, wherein the first shape is determined based on a sphere that is centered within the first region and intersects two portions of the initial mesh on opposite sides of a center of the sphere, determining a representative cross section along a centerline associated with the first region, in response to determining that the geometry for the first region has the first shape that is not suitable for non-additive fabrication, generating a modified geometry for the first region that is suitable for non-additive fabrication based on the representative cross section, and replacing the first region with the modified geometry in the initial mesh to generate the polygonal mesh.

\* \* \* \* \*